United States Patent
Chakra et al.

(10) Patent No.: US 10,068,102 B2
(45) Date of Patent: Sep. 4, 2018

(54) DYNAMIC, TEMPORARY DATA ACCESS TOKEN

(75) Inventors: Al Chakra, Apex, NC (US);
Yongcheng Li, Cary, NC (US); Yuping Connie Wu, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/488,845

(22) Filed: Jun. 5, 2012

(65) Prior Publication Data
US 2012/0246710 A1 Sep. 27, 2012

Related U.S. Application Data

(63) Continuation of application No. 12/825,291, filed on Jun. 28, 2010.

(51) Int. Cl.
*G06F 21/62* (2013.01)

(52) U.S. Cl.
CPC .. *G06F 21/6218* (2013.01); *G06F 2221/2115* (2013.01); *G06F 2221/2137* (2013.01)

(58) Field of Classification Search
CPC .. G06F 21/335; G06F 221/0711; H04L 63/10; H04L 63/105; H04L 41/28; H04W 12/08; H04W 12/00; H04W 4/001
USPC ....... 726/9, 7, 8, 28; 370/42, 250, 342, 450; 713/200, 171
See application file for complete search history.

(56) References Cited

U.S. PATENT DOCUMENTS

| 6,279,111 | B1* | 8/2001 | Jensenworth et al. ......... 726/10 |
| 6,360,254 | B1* | 3/2002 | Linden .............. G06F 17/30876 |
| | | | 707/E17.112 |
| 7,035,854 | B2 | 4/2006 | Hsiao et al. |
| 7,512,973 | B1 | 3/2009 | Chan et al. |

(Continued)

FOREIGN PATENT DOCUMENTS

| CN | 101136915 | 3/2008 |
| EP | 1084464 A1 | 3/2001 |

(Continued)

OTHER PUBLICATIONS

Bussard et al. (2009). Delegation of access rights in multi-domain service compositions. Springer. Retrieved Mar. 20, 2014 from http://download.springer.com/static/pdf/777/art%253A10.1007%252Fs12394-009-0031-5.pdf?auth66=1395504082_2f84e85bb5332351c6b4d1895559b948&ext=.pdf.*

(Continued)

*Primary Examiner* — Brian F Shaw
(74) *Attorney, Agent, or Firm* — Janaki K. Davda; Konrad, Raynes, Davda & Victor LLP

(57) ABSTRACT

Provided are techniques for generating a temporary data access token for a subset of data for a specific period of time for a non-registered user who did not register with a computer providing access to the subset of the data. In response to the non-registered user attempting to access the subset of data with the temporary data access token, it is determined whether the temporary data access token is valid for the subset of data based on the specified period of time. In response to the temporary data access token being valid, the subset of data is provided to the non-registered user. In response to the temporary data access token not being valid, access is denied to the subset of data by the non-registered user.

15 Claims, 5 Drawing Sheets

(56) References Cited

U.S. PATENT DOCUMENTS

| | | | |
|---|---|---|---|
| 8,069,117 B1* | 11/2011 | Gay et al. | 705/54 |
| 8,931,034 B2* | 1/2015 | van Slingerland | H04N 21/4788 705/51 |
| 2002/0077985 A1* | 6/2002 | Kobata | G06F 21/10 705/51 |
| 2003/0046578 A1 | 3/2003 | Brown et al. | |
| 2003/0196087 A1* | 10/2003 | Stringer | G06F 21/6209 713/171 |
| 2004/0006594 A1* | 1/2004 | Boyer et al. | 709/204 |
| 2005/0138388 A1 | 6/2005 | Paganetti et al. | |
| 2005/0254514 A1* | 11/2005 | Lynn | 370/450 |
| 2006/0122945 A1 | 6/2006 | Ripberger et al. | |
| 2007/0157297 A1 | 7/2007 | Patrick | |
| 2007/0199057 A1* | 8/2007 | Plummer | 726/9 |
| 2007/0289024 A1* | 12/2007 | Mohammed | G06F 21/604 726/28 |
| 2008/0133726 A1* | 6/2008 | Richardson | H04L 63/105 709/223 |
| 2008/0263653 A1 | 10/2008 | Lee et al. | |
| 2008/0313085 A1 | 12/2008 | Kravitz et al. | |
| 2009/0126010 A1* | 5/2009 | Chakra et al. | 726/20 |
| 2010/0011431 A1 | 1/2010 | Cynkin et al. | |
| 2010/0100924 A1 | 4/2010 | Hinton | |
| 2011/0072496 A1* | 3/2011 | Bertin | G06F 21/6218 726/4 |
| 2011/0321147 A1 | 12/2011 | Chakra et al. | |
| 2012/0039326 A1 | 2/2012 | Chia et al. | |

FOREIGN PATENT DOCUMENTS

| | | | |
|---|---|---|---|
| EP | 1598729 A2 | 11/2005 | |
| EP | 1684207 A1 | 7/2006 | |
| WO | 9964948 | 12/1999 | |
| WO | 0060503 | 10/2000 | |
| WO | 2009130370 | 10/2009 | |
| WO | WO 2009153477 A1 * | 12/2009 | G06F 21/6218 |

OTHER PUBLICATIONS

Abstract for Publication No. CN101136915, published Mar. 5, 2008, 1 pp.

Atlassian PTY Ltd., "Allowing Other Applications to Access Data on Your Behalf", [online], [Retrieved on Jun. 17, 2010], retrieved from the Internet at <URL: http://confluence.atlassian.com/display/GADGETS/Allowing+Other+Applications . . . >, 4 pp.

Authenex, Inc., "A-Key 3500 Token", [online], 2010 [Retrieved on Jun. 17, 2010], retrieved from the Internet at <URL: http://www.authenex.com/authenex-products/akey-token-3500.html>, 2 pp.

W3C, "Exclusive XML Canonicalization", Version 1.0, [online], Jul. 18, 2002 [retrieved on Jun. 17, 2010], retrieved from the Internet at <URL: http://www.w3.org/TR/xml-exc-c14n>, 16 pp.

Weerasinghe, D., M. Rajarajan, and V. Rakocevic, "Trust Delegation for Medical Records Access Using Public Mobile Networks", 3rd International Conference on Pervasive Computing Technologies for Healthcare, Apr. 2009, 7 pp.

Wikipedia, "Access Token", [online], [Retrieved on Jun. 17, 2010], retrieved from the Internet at <URL: http://en.wikipedia.org/wiki/access_token>, 3 pp.

International Search Report and Written Opinion, dated Oct. 13, 2011, for PCT/EP2011/060017, Total 11 pp.

Preliminary Amendment, Jun. 5, 2012, for U.S. Appl. No. 12/825,291, filed Jun. 28, 2010 by Al Chakra et al., Total 5 pp. [57.201 (PrelimAmend)].

Translation of German Office Action, dated Mar. 4, 2013, Total 4 pp.

Amendment 1, dated Apr. 12, 2013 for U.S. Appl. No. 12/825,291, filed Jun. 28, 2010 by A. Chakra et al., Total 10 pp. [57.201 (Amend1)].

Belenkiy, M., J. Camenisch, M. Chase, M. Kohlweiss, A. Lysyanskaya, and H. Shacham, "Randomizable Proofs and Delegatable Anonymous Credentials", S. Halevi (Ed.) CRYTPO 2009, © International association for Cryptologic Research 2009, Total 18 pp.

English Abstract for EP1084464A1, published on Mar. 21, 2001, Total 2 pp. [ IDS also includes English counterpart: WO9964948 as at least a partial translation of EP1084464A1].

German Office Action, dated Mar. 4, 2013, Total 10 pp.

IDS Report, dated Mar. 15, 2013, from the Mar. 4, 2013 Office Action, Total 8 pp.

Office Action 1, dated Jan. 9, 2013, for U.S. Appl. No. 12/825,291, filed Jun. 28, 2010 by A. Chakra et al., Total 25 pp. [57.201 (OA1)].

Amendment 1, dated Aug. 12, 2013, for U.S. Appl. No. 12/825,291, filed Jun. 28, 2010 by A. Chakra et al., Total 10 pp. [57.201 (Amend2)].

Final Office Action 1, dated May 9, 2013, for U.S. Appl. No. 12/825,291, filed Jun. 28, 2010 by A. Chakra et al., Total 31 pp. [57.201 (FOA1)].

IDS Report, dated Jul. 12, 2013, from the Jul. 4, 2013 Office Action, Total 4 pp.

Office Action 3, dated Aug. 26, 2013, for U.S. Appl. No. 12/825,291, 26 pp. [57.201 (OA3)].

Response to Office Action 3, dated Nov. 22, 2013, for U.S. Appl. No. 12/825,291, 10 pp. [57.201 (ROA3)].

Final Office Action 2, dated Dec. 16, 2013, for U.S. Appl. No. 12/825,291, filed Jun. 28, 2010 by A. Chakra et al., Total 28 pp. [FOA2 (57.201)].

Examination Report, dated Nov. 1, 2017, Application No. GB1300464.3, Total 4 pp.

* cited by examiner

DYNAMIC, TEMPORARY DATA ACCESS TOKEN

CROSS-REFERENCE TO RELATED APPLICATION

This application is a continuation of U.S. patent application Ser. No. 12/825,291, filed on Jun. 28, 2010, which application is incorporated herein by reference in its entirety.

BACKGROUND

1. Field

Embodiments of the invention relate to a dynamic, temporary data access token.

2. Description of the Related Art

Dynamic data (i.e., information) is typically stored and managed in a centralized management system and retrieved and rendered to end users through client applications, such as browser applications. Examples of such applications are: portal, widget-based web application, etc. Access to the data requires that a user first signs in to the centralized management system by, for example, providing a user identifier (ID) and password. Thus, the requirement of signing in makes it difficult for a first user to share portions of the data in a restricted application with a second user who does not have a user identifier and password for signing in to the centralized management system.

For example, it would be useful to share corporate resources, such as conference rooms, a knowledge base, and personal information, to facilitate interaction with customers. As another example, it would be useful to print out paper documents with select information to share with others. For example, a problem occurs when a user wants to print out a paper document that contains both confidential and non-confidential data and wants to print the non-confidential part of the document to share with others.

Some conventional systems build customized applications for outside users, but these are expensive and not flexible.

Thus, there is a need for a dynamic, temporary data access token.

BRIEF SUMMARY

Provided are a method, computer program product, and system for generating a temporary data access token for a subset of data for a specific period of time for a non-registered user who did not register with a computer providing access to the subset of the data. In response to the non-registered user attempting to access the subset of data with the temporary data access token, it is determined whether the temporary data access token is valid for the subset of data based on the specified period of time. In response to the temporary data access token being valid, the subset of data is provided to the non-registered user. In response to the temporary data access token not being valid, access is denied to the subset of data by the non-registered user.

BRIEF DESCRIPTION OF THE SEVERAL VIEWS OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments of the invention. It is understood that other embodiments may be utilized and structural and operational changes may be made without departing from the scope of the invention.

Figure 1:
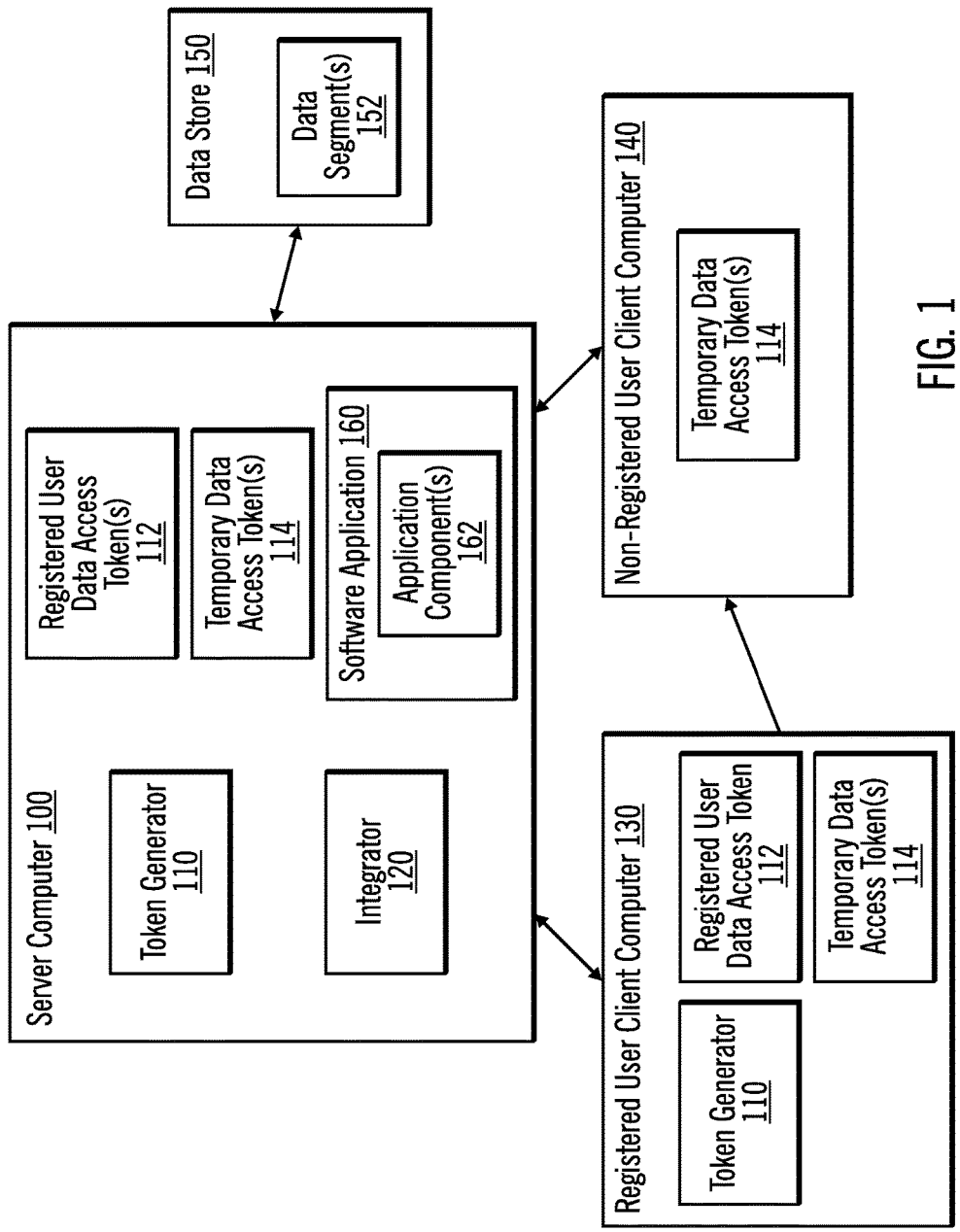
FIG. 1 illustrates a computing architecture in accordance with certain embodiments.

FIG. 1 illustrates a computing architecture in accordance with certain embodiments. A server computer 100 is coupled to a registered user client computer 130 and a non-registered user client computer 140. The registered user client computer 130 is used by a user who registers with the server computer 100 by, for example, providing the server computer 100 with a user ID and password. The registered user client computer 130 is also coupled to the non-registered user client computer 140. The non-registered user client computer 140 is used by a user who does not register with the server computer 100 (e.g., someone who would not normally be given access to data at the server computer 100).

The server computer 100 includes a token generator 110 and an integrator 120. The token generator 110 generates one or more registered user data access tokens 112 and generates one or more temporary data access tokens 114. The temporary data access tokens 114 may also be referred to as non-registered user data access tokens, limited tokens, temporal tokens, or delegated tokens. An integrator 120 may be described as a software component that integrates the output from various other software components.

The server computer 100 stores at least one software application 160, which includes one or more application components 162. An application component 162 may be described as part of the software application 160 and serves a specific function, such as weather report application component. Other examples of application components 162 are portions of the application that produce data for the web page (e.g., an applet or a servlet). Although one software application 162 is illustrated, embodiments may include any number of software applications.

In certain embodiments, the registered user client computer 130 also includes a token generator 110. In certain embodiments, the token generator 110 at the registered user client computer 110 generates one or more one or more temporary data access tokens 114. The registered user client computer 130 stores a registered user data access token 112 that is provided by the server computer 100. The registered user client computer 130 uses the registered user data access token 112 to access data at the server computer 100.

The non-registered user client computer stores a non-registered use data access token 114 and uses the non-registered use data access token to access the data at the server computer 100.

The server computer 100 is coupled to a data store 150. The data store 150 stores one or more data segments 152. Data segments 152 may be described as a database server that can be used to store and retrieve data. An example of a data segment 152 is a dynamic content of a page of a web site.

Embodiments provide a new security model in which data segments 152 and/or application components 162 are associated with data access tokens (also referred to as security tokens) to provide more granular access control. The token generator 110 allows a user who has registered with the server computer 100 to specify a temporary data access token 114. In certain embodiments, the temporary data access token 114 is shared by one or more non-registered users for a specific period of time (i.e., for a time period in which a web conference is occurring), for a subset of the data available at the server computer 100, for a number of times the temporary data access token 114 can be used, and/or other factors.

Moreover, the temporary data access token 114 has attributes, and these attributes are dynamic. The attributes are dynamic in that the attributes can be changed (i.e., updated or modified) after the temporary data access token 114 has been issued. For example, the expiration date can be modified. The subset of the data that can be viewed by the temporary data access token 114 can be modified.

Initially, the user at the registered user client computer 130 registers with the server computer 100 and obtains a registered user data access token 112. Then, the registered user at the registered user client computer 130 uses the registered user data access token 112 to access data at the server computer 100.

Figure 2:
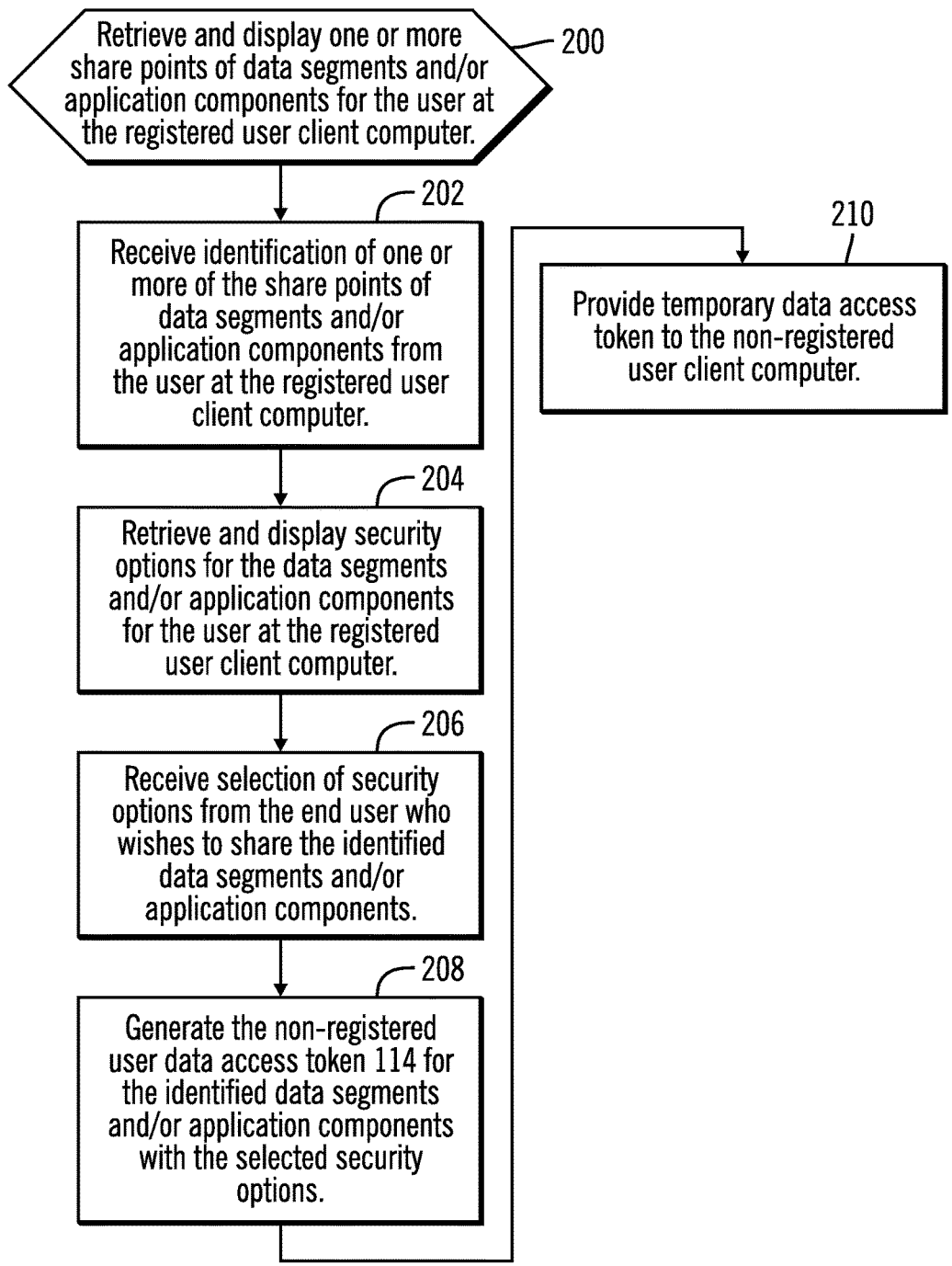
FIG. 2 illustrates logic for sharing data with a non-registered user in accordance with certain embodiments.

FIG. 2 illustrates logic for sharing data with a non-registered user in accordance with certain embodiments. Control begins in block 200 with the token generator 110 at the server computer 100 retrieving and displaying one or more share points of data segments 152 and/or application components 162 (e.g., via a Graphical User Interface (GUI)) for the user at the registered user client computer 130. In certain embodiments, the token generator 110 displays the one or more share points in response to a request from the registered user at the registered user client computer 130.

In block 202, the token generator 110 at the server computer 100 receives identification of one or more of the share points of data segments 152 and/or application components 162 from the user at the registered user client computer 130. Then, a user at the registered user client computer 130 identifies the one or more share points of data segments 152 and/or application components 162 via the GUI.

Thus, in embodiments, the token generator 110 at the server computer 100 provides application logic to enforce the security configuration.

In block 204, the token generator retrieves and displays security options for the identified data segments 152 and/or application components 162 for the user at the registered user client computer 130. In certain embodiments, there are different security options associated with different data segments 152 and/or application components 162. Examples of security options are the capability of view and edit the content.).

In block 206, the token generator 110 at the server computer 100 receives selection of security options from the end user who wishes to share the identified data segments 152 and/or application components 162.

In block 208, the token generator 110 generates the temporary data access token 114 for the identified data segments 152 and/or application components 162 with the selected security options. In certain embodiments, the token generator 110 at the server computer 100 generates the temporary data access token 114. In certain embodiments, the token generator 110 at the registered user client computer 130 generates the temporary data access token 114.

In block 210, the temporary data access token 114 is provided to the non-registered user client computer 140. In certain embodiments, the token generator 110 at the server computer provides the temporary data access token 114 to the non-registered user client computer 140. In certain embodiments, the token generator at the registered client computer 130 provides the temporary data access token 114 to the non-registered user client computer 140.

Then, a non-registered user at the non-registered client computer 140 accesses the identified data segments 152 and/or application components 162 using the temporary data access token 114. Thus, a user can access (e.g., view or edit) the identified data segments 152 and/or application components 162 without signing in to the server computer 100.

In certain embodiments, a password is created for the temporary data access token 114. In such a case, the password and the temporary data access token 114 are provided to the non-registered user at the non-registered user client computer 140.

In embodiments, there are various levels of access control. At the highest application component level, each application component 162 registers to the integrator 120. When the integrator 120 receives a request to access an application component 162, the integrator 120 uses the temporary data access token 114 to determine whether to allow or deny access to the application component 162. When the application component 162 is allowed for access, the integrator 120 provides the application component 162 to the non-registered user client computer 140, otherwise, the application component 162 is bypassed. Thus, if multiple application components 162 are requested, and a subset (one or more) of the application components 162 are not allowed for access, these application components 162 are not provided to the non-registered user client computer 140, while the allowed application components 162 are provided.

At the data record level are related to the data segments 152. For example, the data records are like personal profile fields, such as name, contact, projects, etc. Each data record registers itself with the integrator 120, and the temporary data access token 114 is used to decide when a subset of the records are to be provided to the non-registered user client computer 140. When the integrator 120 receives a request to access a data record, the integrator 120 uses the temporary data access token 114 to determine whether to allow or deny access to the data record. When the data record is allowed for access, the integrator 120 provides the data record to the non-registered user client computer 140, otherwise, the data record is bypassed. Thus, if multiple data records are requested, and a subset (one or more) of the data records are not allowed for access, these data records are not provided to the non-registered user client computer 140, while the allowed data records are provided.

Figure 3:
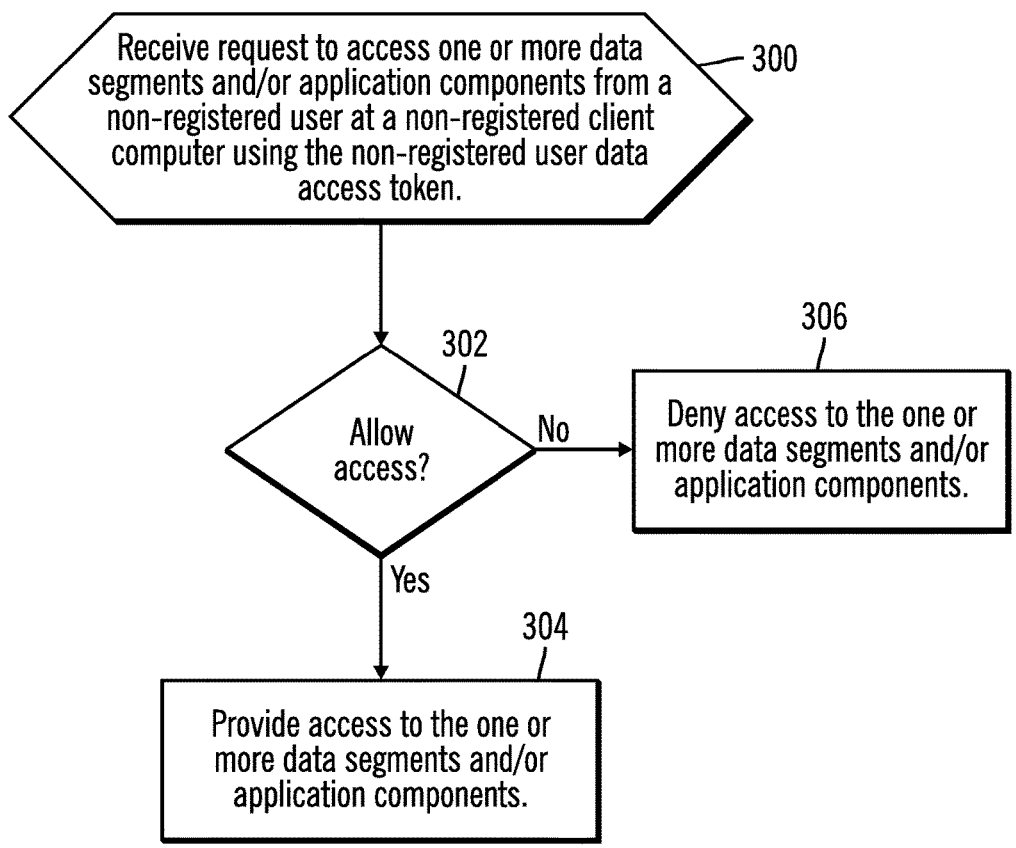
FIG. 3 illustrates logic for determining access in accordance with certain embodiments.

FIG. 3 illustrates logic for determining access in accordance with certain embodiments. Control begins at block 300 with the integrator 120 receiving a request to access one or more data segments 152 and/or application components 162 from a non-registered user at a non-registered client computer 140 using the temporary data access token 114. In block 302, the integrator 120 determines whether to allow access. The determination is based on the data segments 152 and/or application components 162 and the security options associated with the temporary data access token 114. If the access is allowed, processing continues to block 304, otherwise, processing continues to block 306. In block 304, the integrator 120 provides access to the one or more data segments 152 and/or application components 162. In block 306, the integrator 120 denies access to the one or more data segments 152 and/or application components 162.

In embodiments, there are various configuration types. As a first example, the software application 160 running at the server computer 100 displays the options of granular access, and the user then chooses a subset. As a second example, the software application 160 displays the options of access policies (e.g., insider, partner, and customer), and the user at the registered user client compute 130 then selects a policy. As a further example, the configuration type may be a combination of the first and second examples.

Figure 4:
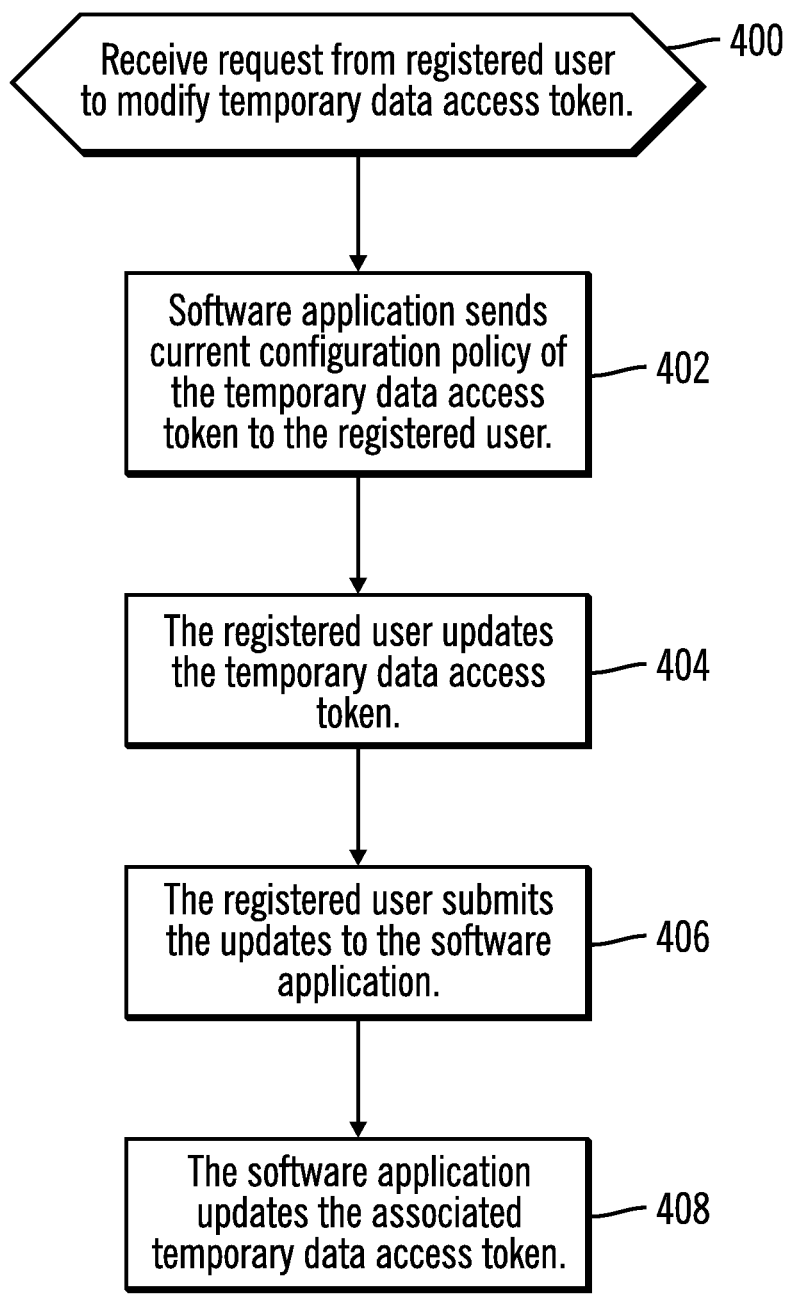
FIG. 4 illustrates logic for dynamically updating a temporary data access token in accordance with certain embodiments.

FIG. 4 illustrates logic for dynamically updating the temporary data access token 114 in accordance with certain embodiments. The temporary data access token 114 is associated with a registered user 112. Control begins in block 400 with the software application 160 receiving a request from the registered user (at the registered use client computer 130) to modify the temporary data access token 112. In certain embodiments, the software application 160 is a server application. In block 402, the software application 160 sends the current configuration policy of the temporary data access token 114 to the registered user. In block 404, the registered user updates the temporary data access token 114 by updating the configuration policy. In block 406, the registered user submits the updates to the software application 160 by sending the updated configuration policy. In block 408, the software application 160 updates the associated temporary data access token 114 by saving the updated configuration policy. For example, the attributes (e.g., the period of time) of the temporary data access token 114 may be updated. Thus, in certain embodiments, the temporary data access token 114 is dynamically updated (without updating the associated registered user data access token 112). The updates are saved at the server computer 100. Then, when the non-registered user at the non-registered user client computer 140 attempts to access one or more data segments 152 and/or application components 162, the integrator 130 uses the updated information to determine whether to allow access.

Thus, embodiments may be used in business-to-business (B2B) applications in which content or work is shared between collaborating businesses. One example might be in sharing specific aspects of internal content repositories with potential suppliers that are submitting bids to provide products/services.

In certain embodiments, non-registered users receive Uniform Resource Locators (URLs) to access data segments 152 and/or application components 162 with an embedded token that grants access, and these non-registered users are not required to establish accounts, logins, and so on, ahead of time.

Additional Embodiment Details

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, solid state memory, magnetic tape or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The code implementing the described operations may further be implemented in hardware logic or circuitry (e.g., an integrated circuit chip, Programmable Gate Array (PGA), Application Specific Integrated Circuit (ASIC), etc.

Figure 5:
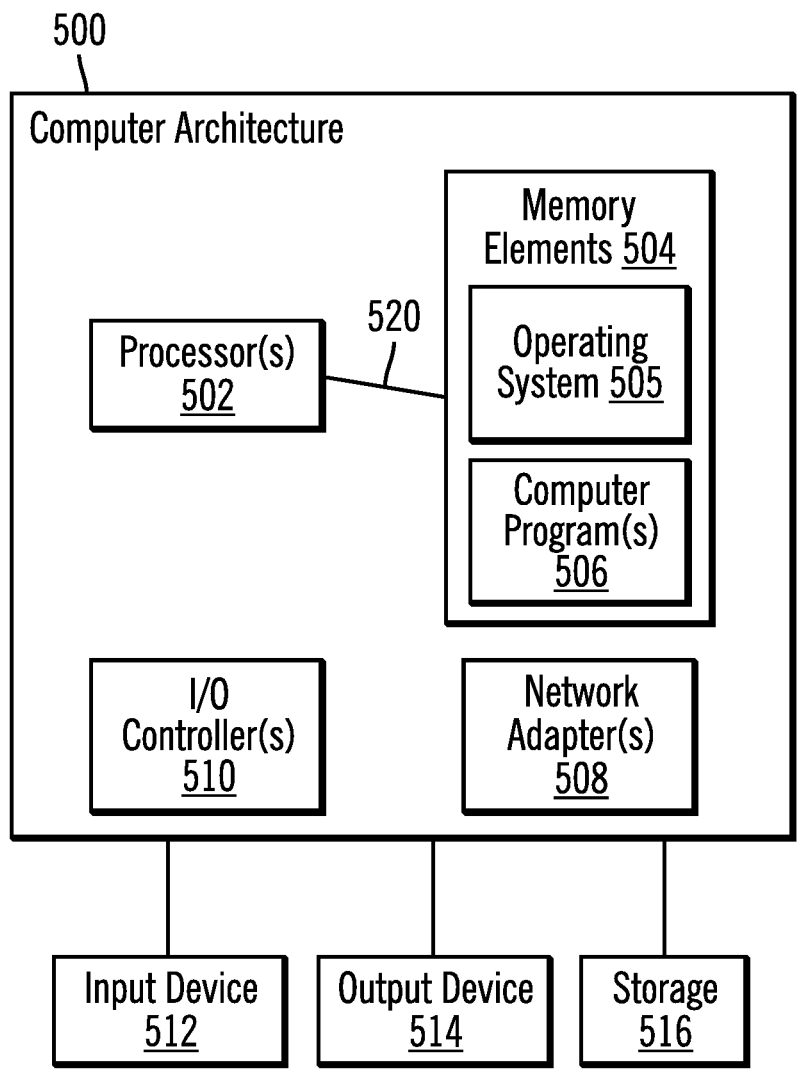
FIG. 5 illustrates a computer architecture that may be used in accordance with certain embodiments.

FIG. 5 illustrates a computer architecture 500 that may be used in accordance with certain embodiments. Server computer 100, registered user client computer 130, and/or non-registered user client computer 140 may implement computer architecture 500. The computer architecture 500 is suitable for storing and/or executing program code and includes at least one processor 502 coupled directly or indirectly to memory elements 504 through a system bus 520. The memory elements 504 may include local memory employed during actual execution of the program code, bulk storage, and cache memories which provide temporary storage of at least some program code in order to reduce the number of times code must be retrieved from bulk storage during execution. The memory elements 504 include an operating system 505 and one or more computer programs 506.

Input/Output (I/O) devices 512, 514 (including but not limited to keyboards, displays, pointing devices, etc.) may be coupled to the system either directly or through intervening I/O controllers 510.

Network adapters 508 may also be coupled to the system to enable the data processing system to become coupled to other data processing systems or remote printers or storage devices through intervening private or public networks. Modems, cable modem and Ethernet cards are just a few of the currently available types of network adapters 508.

The computer architecture 500 may be coupled to storage 516 (e.g., a non-volatile storage area, such as magnetic disk drives, optical disk drives, a tape drive, etc.). The storage 516 may comprise an internal storage device or an attached or network accessible storage. Computer programs 506 in storage 516 may be loaded into the memory elements 504 and executed by a processor 502 in a manner known in the art.

The computer architecture 500 may include fewer components than illustrated, additional components not illustrated herein, or some combination of the components illustrated and additional components. The computer architecture 500 may comprise any computing device known in the art, such as a mainframe, server, personal computer, workstation, laptop, handheld computer, telephony device, network appliance, virtualization device, storage controller, etc.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The foregoing description of embodiments of the invention has been presented for the purposes of illustration and description. It is not intended to be exhaustive or to limit the embodiments to the precise form disclosed. Many modifications and variations are possible in light of the above teaching. It is intended that the scope of the embodiments be limited not by this detailed description, but rather by the claims appended hereto. The above specification, examples and data provide a complete description of the manufacture and use of the composition of the embodiments. Since many embodiments may be made without departing from the spirit and scope of the embodiments, the embodiments reside in the claims hereinafter appended or any subsequently-filed claims, and their equivalents.

The invention claimed is:

1. A method implemented in a software application of a computer, the software application comprising a plurality of application components, the method comprising:
   sending, using a hardware processor of the computer, a configuration policy of a temporary data access token to a registered user, wherein the configuration policy allows access to a first portion of data without allowing access to a second portion of the data, and wherein at least one of the first portion of the data and the second portion of the data is comprised of one or more of the plurality of application components; and
   receiving, using the hardware processor of the computer, an updated configuration policy from the registered user to allow access to the second portion of the data without allowing access to the first portion of the data, and
   wherein a non-registered user utilizing the temporary data access token associated with the updated configuration policy is denied access to the first portion of the data and allowed access to the second portion of the data by a software other than the software application.

2. The method of claim 1, wherein the registered user assigns the temporary data access token to the non-registered user.

3. The method of claim 1, wherein the temporary data access token enables any of data viewing and data editing.

4. The method of claim 1, wherein the data comprises a plurality of portions comprising data segments.

5. The method of claim 1, wherein the temporary data access token is generated using the hardware processor of the computer.

6. A computer, comprising:
   a hardware processor; and
   storage coupled to the hardware processor, wherein the storage stores a software application comprising a plurality of application components, and wherein the hardware processor is configured to execute the software application to perform operations, wherein the operations comprise:
   sending a configuration policy of a temporary data access token to a registered user, wherein the configuration policy allows access to a first portion of data without allowing access to a second portion of the data, and wherein at least one of the first portion of the data and the second portion of the data is comprised of one or more of the plurality of application components; and
   receiving an updated configuration policy from the registered user to allow access to the second portion of the data without allowing access to the first portion of the data, and
   wherein a non-registered user utilizing the temporary data access token associated with the updated configuration policy is denied access to the first portion of the data and allowed access to the second portion of the data by a software other than the software application.

7. The computer of claim 6, wherein the registered user assigns the temporary data access token to the non-registered user.

8. The computer of claim 6, wherein the temporary data access token enables any of data viewing and editing.

9. The computer of claim 6, wherein the data comprises a plurality of portions comprising data segments.

10. The computer of claim 6, wherein the temporary data access token is generated using the hardware processor of the computer.

11. A computer program product comprising a non-transitory computer readable storage medium including a computer readable software application, the computer readable software application comprising a plurality of application components, wherein the computer readable software application, when executed by a hardware processor on a computer causes the computer to perform:
   sending a configuration policy of a temporary data access token to a registered user, wherein the configuration policy allows access to a first portion of data without allowing access to a second portion of the data, and wherein at least one of the first portion of the data and the second portion of the data is comprised of one or more of the plurality of application components; and
   receiving an updated configuration policy from the registered user to allow access to the second portion of the data without allowing access to the first portion of the data, and
   wherein a non-registered user utilizing the temporary data access token associated with the updated configuration policy is denied access to the first portion of the data and allowed access to the second portion of the data by a software other than the computer readable software application.

12. The computer program product of claim 11, wherein the registered user assigns the temporary data access token to the non-registered user.

13. The computer program product of claim 11, wherein the temporary data access token enables any of data viewing and editing.

14. The computer program product of claim 11, wherein the data comprises a plurality of portions comprising data segments.

15. The computer program product of claim 11 wherein the temporary data access token is generated using the hardware processor of the computer.

* * * * *